United States Patent
Gagein et al.

(10) Patent No.: US 11,859,592 B2
(45) Date of Patent: Jan. 2, 2024

(54) WIND TURBINE

(71) Applicant: Siemens Gamesa Renewable Energy A/S, Brande (DK)

(72) Inventors: Amandeep Gagein, Haryana (IN); Pankaj Narang, Delhi (IN); Frederik Sig Pedersen, Aarhus C (DK); Anders Nygaard Rasmussen, Horsens (DK); Vipin Sendwal, Haryana (IN)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/189,602

(22) Filed: Mar. 2, 2021

(65) Prior Publication Data

US 2021/0277873 A1    Sep. 9, 2021

(30) Foreign Application Priority Data

Mar. 9, 2020 (EP) .................................... 20161879

(51) Int. Cl.
*F03D 13/20* (2016.01)
*F03D 80/80* (2016.01)

(52) U.S. Cl.
CPC ............. *F03D 13/22* (2016.05); *F03D 80/88* (2016.05); *F05B 2230/60* (2013.01)

(58) Field of Classification Search
CPC ....... F03D 13/22; F03D 80/88; F05B 2230/60
See application file for complete search history.

(56) References Cited

U.S. PATENT DOCUMENTS

| | | | | |
|---|---|---|---|---|
| 2009/0294219 | A1* | 12/2009 | Oliphant | B66B 9/187 187/244 |
| 2019/0040844 | A1* | 2/2019 | Da Silva | F03D 13/25 |
| 2019/0195201 | A1 | 6/2019 | Thrue et al. | |
| 2019/0249647 | A1* | 8/2019 | Lynderup | F03D 80/82 |
| 2019/0264661 | A1* | 8/2019 | Donescu | E02B 17/0034 |
| 2020/0248675 | A1 | 8/2020 | Blaabjerg et al. | |

FOREIGN PATENT DOCUMENTS

| | | |
|---|---|---|
| CN | 110030162 A | 7/2019 |
| EP | 3438449 A1 | 2/2019 |
| EP | 3502353 A1 | 6/2019 |
| EP | 3546742 A1 | 10/2019 |
| EP | 3690235 A1 | 8/2020 |

OTHER PUBLICATIONS

European Search Report dated Sep. 25, 2020 for application No. 20161879.0.

* cited by examiner

*Primary Examiner* — Sean Gugger
(74) *Attorney, Agent, or Firm* — Schmeiser, Olsen & Watts LLP

(57) ABSTRACT

Provided is a wind turbine, including a tower, a foundation, a transition piece, which is arranged between the tower and the foundation and which connects the tower to the foundation, a platform, which is arranged inside the transition piece, a service lift, which is lowered to the platform, and a permanent working platform which is arranged below the platform and in a distance thereof. Due to the permanent working platform, the service lift is easily accessible from below. The labor- and cost-intensive installation of a temporary scaffold below the platform is expendable. Advantageously, the working platform can also be used for array cable installation.

17 Claims, 6 Drawing Sheets

WIND TURBINE

CROSS-REFERENCE TO RELATED APPLICATIONS

This application claims priority to EP Application No. 20161879.0, having a filing date of Mar. 9, 2020, the entire contents of which are hereby incorporated by reference.

FIELD OF TECHNOLOGY

The following relates to a wind turbine.

BACKGROUND

A wind turbine has a tower, a nacelle, which is arranged on top of the tower, a hub with rotor blades being rotatable supported at the nacelle and a generator being provided inside the nacelle and being driven by the hub. Inside the tower can be arranged electrical equipment like a switch gear or a service lift which can be arranged on a switch gear platform. According to internal knowledge of the applicant, there can be provided a temporary scaffold below the switch gear platform to get access to the electrical equipment.

SUMMARY

An aspect relates to provide an improved wind turbine.

Accordingly, a wind turbine, comprising a tower, a foundation, a transition piece, which is arranged between the tower and the foundation and which connects the tower to the foundation, a platform, which is arranged inside the transition piece, a service lift, which can be lowered to the platform, and a permanent working platform, which is arranged below the platform and in a distance thereof, is provided.

Due to the permanent working platform, the service lift is easily accessible from below. The labor- and cost-intensive installation of a temporary scaffold below the platform is expendable. Advantageously, the working platform can also be used for array cable installation.

The wind turbine comprises a nacelle that is mounted on or at the tower. Rotor blades are connected to a hub that is supported at the nacelle. A generator is placed inside the nacelle. The generator is connected to the hub. The generator is coupled to a switch gear. The switch gear is supported inside the transition piece.

The foundation is mounted in the seabed. The tower comprises a plurality of tower sections that are stacked on each other and that are connected to each other. A lowest tower section is connected to the transition piece. The nacelle is supported by means of a topmost tower section of the tower. The service lift can be moved from the transition piece to the topmost tower section. When the service lift is in its lowest position, it is arranged inside the transition piece.

The transition piece has a cylindrical, in particular a tube-shaped, geometry. The transition piece and the lowest tower section both can have flanges. The two flanges are bolted together to connect the tower to the transition piece. A longitudinal direction of the tower is oriented from the nacelle in direction of the foundation. The service lift can be moved along the longitudinal direction and vice versa. "Permanent" in this context means that the working platform is not removed for operation of the wind turbine. The working platform stays in the transition piece for the whole lifetime of the wind turbine.

According to an embodiment, the distance is between 2 m and 3 m, desirably 2.5 m.

The distance can be chosen as needed. However, the distance is around 2.5 m.

According to a further embodiment, the wind turbine further comprises a plurality of support beams which run along a longitudinal direction of the tower, wherein the platform and the working platform are both attached to the support beams.

The support beams carry both, the platform and the working platform. The support beams keep the platform and the working platform spaced apart.

According to a further embodiment, the support beams are connected to a flange of the transition piece.

The support beams are connected only to the flange. In this way, the support beams are hung into the transition piece.

According to a further embodiment, the platform is supported by means of a first support structure, wherein the working platform is supported by means of a second support structure, and wherein the first support structure and the second support structure are both connected to the support beams.

The support structures both comprise a plurality of beams that are connected together. The support structures are ring-shaped.

According to a further embodiment, the wind turbine further comprises a platform arrangement which is suspended in the transition piece, wherein the platform arrangement comprises the platform, the working platform and the support beams.

The platform arrangement is suspended in the transition piece in a hanging manner. "Hanging suspension" in this context means that the platform arrangement is hooked into the transition piece. That means, the platform arrangement is supported from above by means of the support beams. A support from below is not necessary.

According to a further embodiment, the platform and the working platform are attached to a wall of the transition piece.

The attachment to the wall can be alternatively or additionally. The wall has a cylindrical, in particular tube-shaped, geometry.

According to a further embodiment, the wind turbine further comprises a switch gear which is arranged on the platform.

"Switch gear" in this context means an electric and/or electronic component that is part of an electric power system. The switch gear can be composed of electrical disconnect switches, fuses or circuit breakers used to control, protect and isolate electrical equipment. The switch gear can be used both to de-energize equipment to allow work to be done and to clear faults downstream. The switch gear is arranged on the platform. However, the platform does not support the weight of the switch gear. The weight of the switch gear can be carried by a suspension structure which is connected to the support beams.

According to a further embodiment, the working platform has an elevated working section which is arranged below the switch gear.

This allows an easy access to the switch gear. In particular, this simplifies the installation of array cables to the switch gear.

According to a further embodiment, the working section is elevated 100 mm to 500 mm, desirably 300 mm, above the working platform.

The elevation can be adjusted as needed. This allows a comfortable access to the switch gear.

According to a further embodiment, the platform comprises a centrally arranged hatch which can be opened and closed.

Array cables can be guided through the hatch. This simplifies the installation of the array cables.

According to a further embodiment, the working platform comprises a service space for mounting and/or maintaining the service lift.

The service space is positioned below the service lift.

According to a further embodiment, the working platform comprises openings for pulling in array cables.

The openings enable a good access to the array cables. This reduces installation labor.

According to a further embodiment, the working platform has a circular shape.

"Circular" in this context means that the working platform has the shape of a circular disk.

According to a further embodiment, the working platform has a semi-circular shape.

"Semi-circular" in this context means that the working platform has the shape of a semi-circular disk.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

In the Figures, like reference numerals designate like or functionally equivalent elements, unless otherwise indicated.

DETAILED DESCRIPTION

Figure 1:
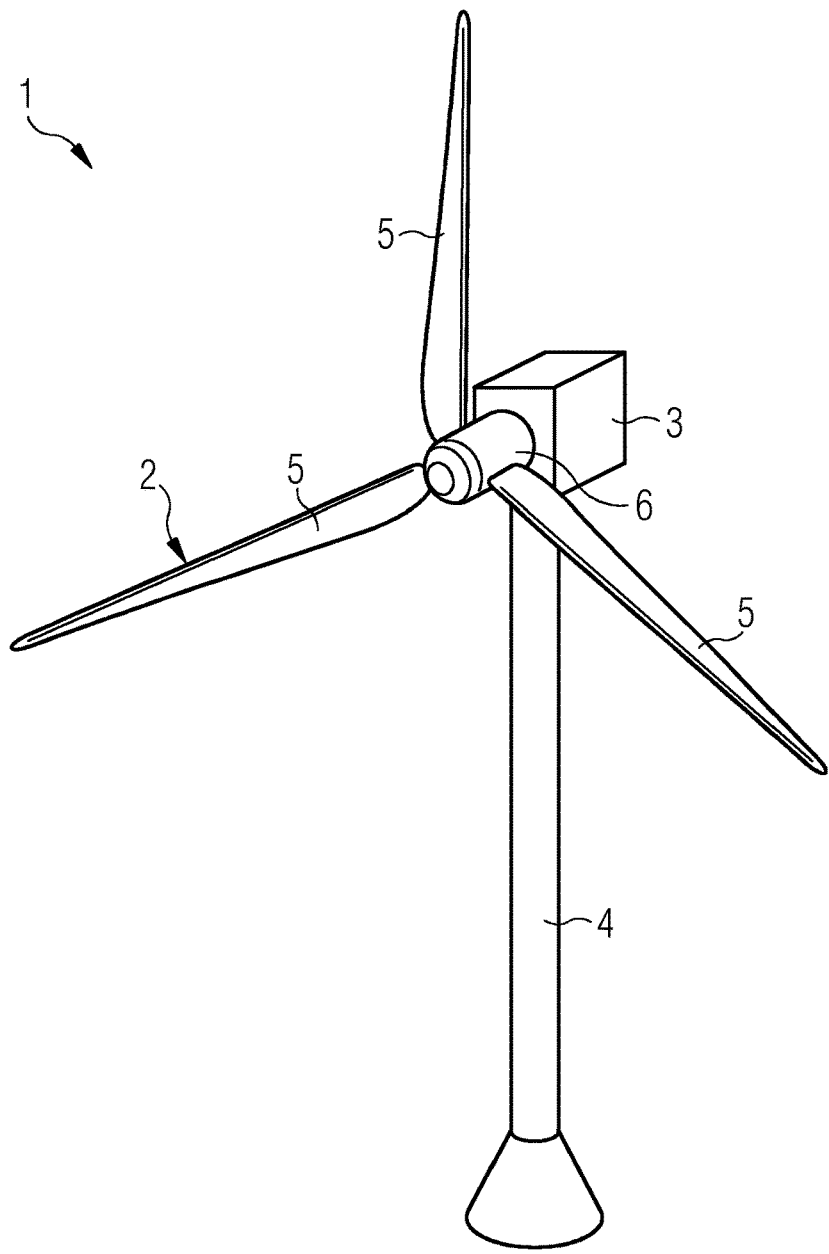
FIG. 1 shows a perspective view of a wind turbine according to one embodiment.

FIG. 1 shows a wind turbine 1 according to one embodiment.

The wind turbine 1 comprises a rotor 2 connected to a generator (not shown) arranged inside a nacelle 3. The nacelle 3 is arranged at the upper end of a tower 4 of the wind turbine 1. The tower 4 has a plurality of tower sections that are arranged on top of each other. The tower 4 can be named wind turbine tower.

The rotor 2 comprises three rotor blades 5. The rotor blades 5 are connected to a hub 6 of the wind turbine 1. Rotors 2 of this kind may have diameters ranging from, for example, 30 to 160 meters or even more. The rotor blades 5 are subjected to high wind loads. At the same time, the rotor blades 5 need to be lightweight. For these reasons, rotor blades 5 in modern wind turbines 1 are manufactured from fiber-reinforced composite materials. Therein, glass fibers are generally desired over carbon fibers for cost reasons. Oftentimes, glass fibers in the form of unidirectional fiber mats are used.

Figure 2:
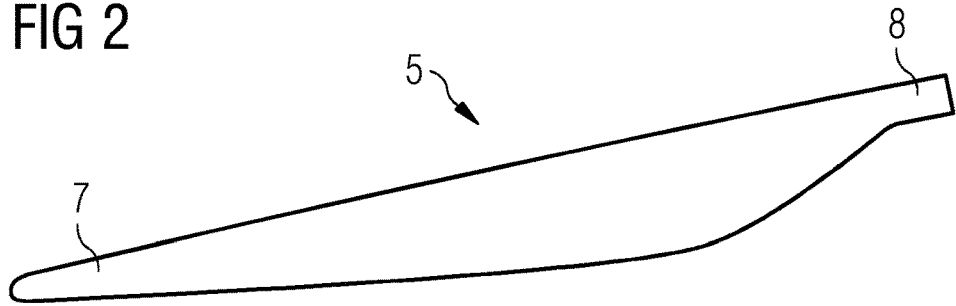
FIG. 2 shows a perspective view of a wind turbine rotor blade according to one embodiment.

FIG. 2 shows a rotor blade 5 according to one embodiment.

The rotor blade 5 comprises an aerodynamically designed portion 7, which is shaped for optimum exploitation of the wind energy and a blade root 8 for connecting the rotor blade 5 to the hub 6.

Figure 3:
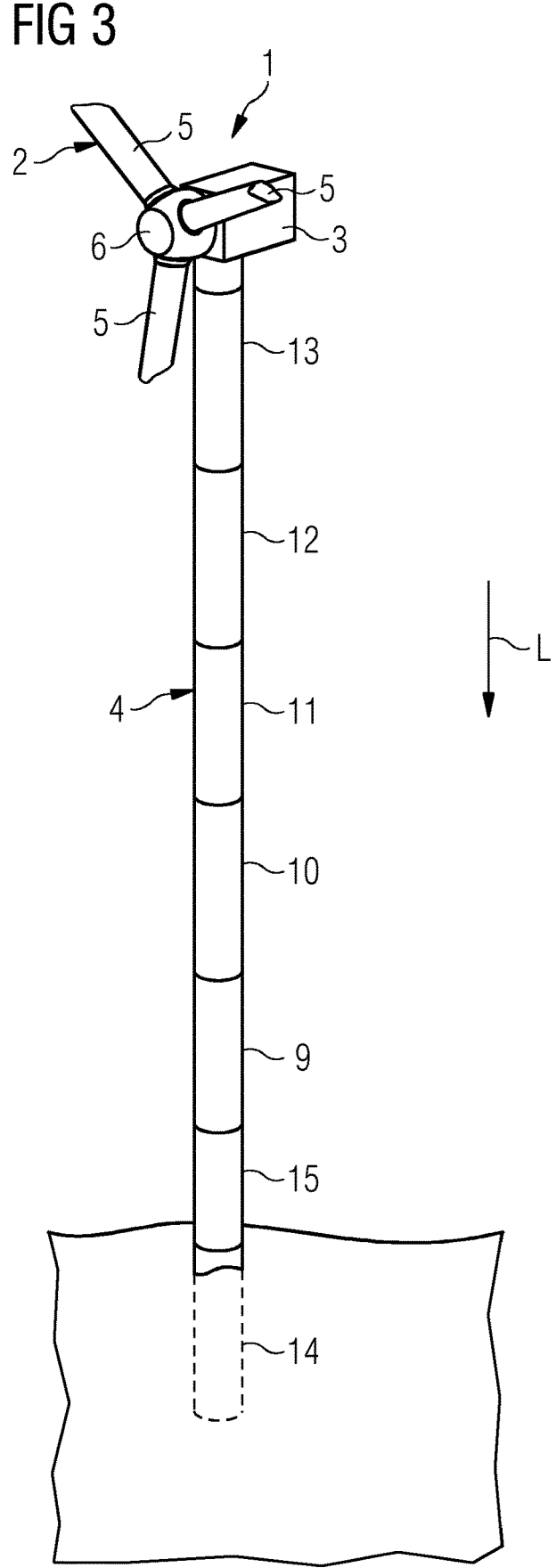
FIG. 3 shows a further perspective view of the wind turbine according to FIG. 1.

FIG. 3 shows again the wind turbine 1 according to FIG. 1.

As mentioned before, the tower 4 has a plurality of tower sections 9 to 13 that are arranged on top of each other. The number of tower sections 9 to 13 is arbitrary. The tower 4 has a lowest tower section 9 and a topmost tower section 13. The nacelle 3 can be attached to the topmost tower section 13. The wind turbine 1 has a foundation 14 that can be anchored in the seabed. Between the foundation 14 and the lowest tower section 9 is arranged a transition piece 15.

The transition piece 15 is a circular or tubular piece that connects the tower 4 to the foundation 14. Thereby, the transition piece 15 forms a transition between the foundation 14 and the tower 4. An external platform (not shown) can be attached to the transition piece 15. The tower 4 has a longitudinal direction L. The longitudinal direction L is oriented from the topmost tower section 13 toward the foundation 14. However, the longitudinal direction L can be oriented vice versa.

Figure 4:
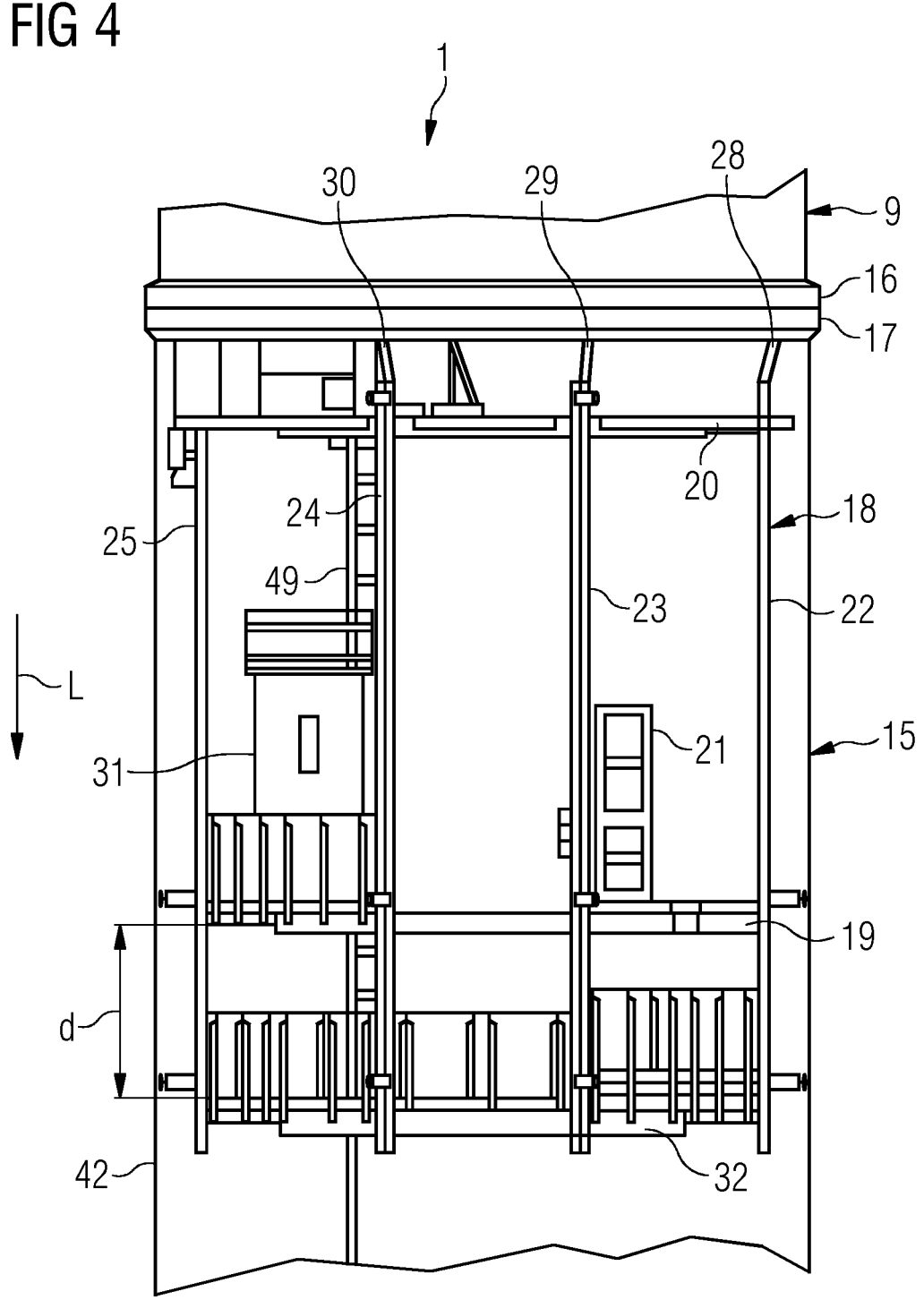
FIG. 4 shows a cross-sectional view of a transition piece according to one embodiment.

FIG. 4 shows an enlarged cutout of the wind turbine 1.

The lowest tower section 9 has a flange 16 that is connected to a flange 17 of the transition piece 15. The transition piece 15 receives a platform arrangement 18. The platform arrangement 18 is shown in a schematic perspective view in FIG. 6, whereas FIG. 7 shows a schematic perspective view of another embodiment of the platform arrangement 18.

The platform arrangement 18 has a first or lower platform 19 and a second or upper platform 20. The platforms 19, 20 are arranged parallel to each other. When seen along the longitudinal direction L, the platforms 19, 20 are spaced apart from each other. The upper platform 20 can be used to connect or to bolt the flanges 16, 17 together. For this reason, the upper platform 20 can be named bolt tightening platform.

A switch gear 21 is arranged on the lower platform 19. For this reason, the lower platform 19 can be named switch gear platform. "Switch gear" in this context means an electric and/or electronic component that is part of an electric power system. The switch gear 21 can be composed of electrical disconnect switches, fuses or circuit breakers used to control, protect and isolate electrical equipment. The switch gear 21 can be used both to de-energize equipment to allow work to be done and to clear faults downstream.

The platform arrangement 18 has a plurality of support beams 22 to 27. The support beams 22 to 27 (see FIGS. 6 and 7) run along the longitudinal direction L. The support beams 22 to 27 connect the platforms 19, 20 to each other. There can be provided a carrying structure that carries the switch gear 21. The carrying structure can be connected to the support beams 22 to 27. In this way, the lower platform 19 does not have to carry the weight of the switch gear 21.

The number of support beams 22 to 27 is arbitrary. For example, there can be provided six support beams 22 to 27. The support beams 22 to 27 are connected to the flange 17 by means of attachment elements 28 to 30. The number of attachment elements 28 to 30 is the same as the number of support beams 22 to 27. The wind turbine 1 has a service lift 31 for transporting technicians from the lower platform 19 to the nacelle 3. The service lift 31 can be lowered to the lower platform 19.

The pull-in of the array cables and routing thereof toward the switch gear 21 is rather complicated due to the stiffness of the array cables, the lack of space or unstable temporary scaffold below the lower platform 19. This makes the work below the switch gear 21 rather difficult inside the transition piece 15 or inside the tower 4. Further, the service lift 31 needs access from below to be maintained.

The design of the internal of the transition piece 15, where the switch gear 21 is located, is often a cooperation between the wind turbine manufacturer and the manufacturer of the transition piece 15. Hence, the result is often a new design that must be tested by means of mockups and workshops before it is shipped offshore prior to array cable installation to ensure that it will work and that there is sufficient space to handle the array cables.

The solution for the service lift 31 has earlier been that the service lift 31 stops at the lowest platform within the tower 4, namely in the lowest tower section 9. A bolt connection platform below the connection between the tower 4 and the transition piece 15 can then be used as service area.

Figure 5:
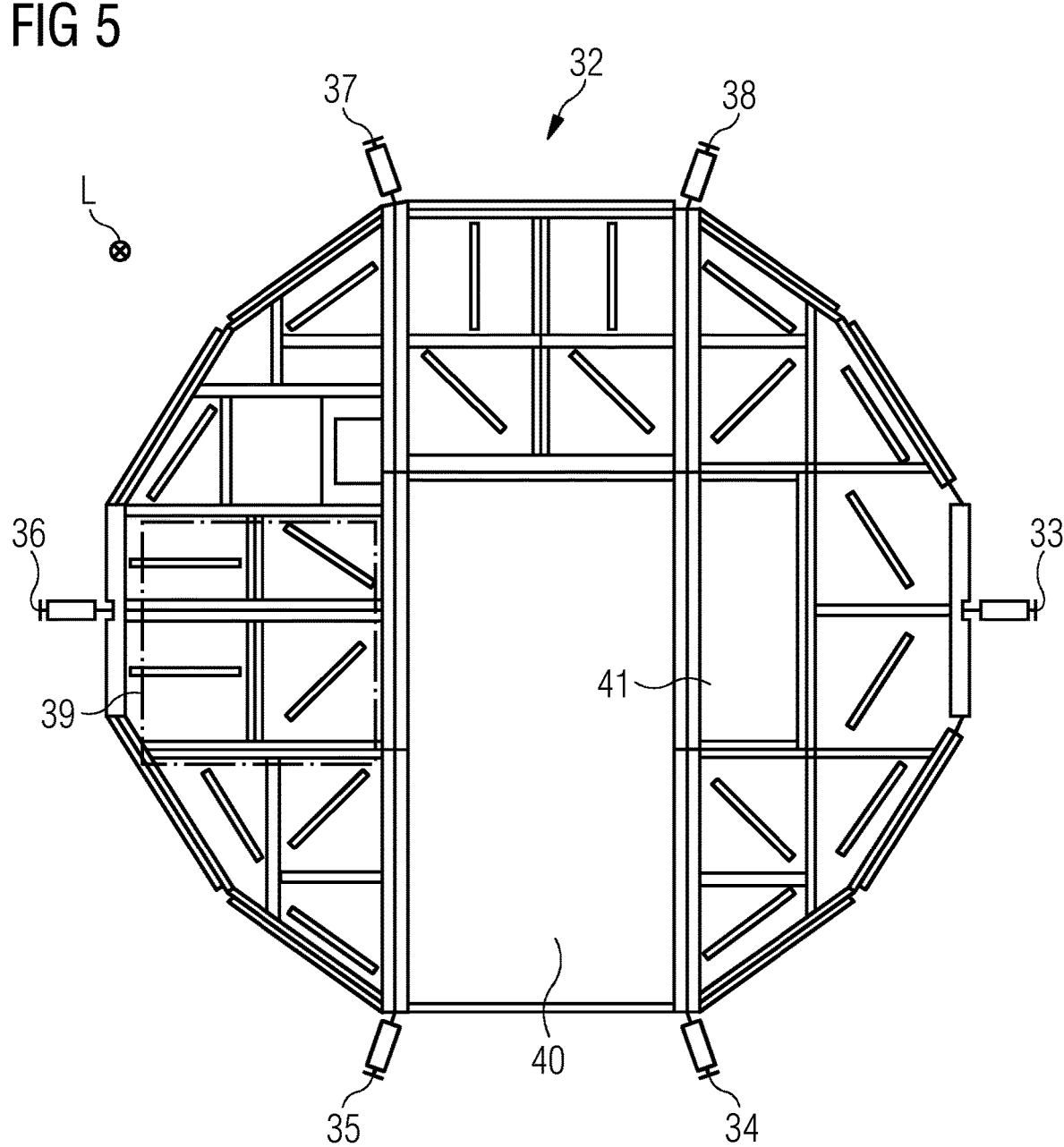
FIG. 5 shows a top view of a platform according to one embodiment.

Now turning back to FIG. 4. To overcome the above mentioned drawbacks, an additional permanent working platform 32 that is arranged below the lower platform 19 is provided. As can be seen from FIG. 5, the working platform 32, as also the platforms 19, 20 are, is provided with support elements 33 to 38 that lie against the transition piece 15 from the inside thereof. The support elements 33 to 38 are assigned to the support beams 22 to 27.

The working platform 32 has an installation and/or service space 39 for installing and servicing the service lift 31. Further, the working platform 32 has openings 40, 41 for pulling in array cables (not shown) and easy handling of the array cables. The working platform 32 is also attached to the support beams 22 to 27. The working platform 32 is arranged parallel to the lower platform 19. When seen along the longitudinal direction L, the working platform 32 is arranged in a distance d of around 2.5 m away from the lower platform 19.

By having the permanent working platform 32 below the lower platform 19 where the switch gear 21 is located, there is provided a permanent solution for servicing the service lift 31 and for easing the routing and handling of the array cables. An airtight platform is arranged below the working platform 32, and thereby the cable hang-off of the transition piece 15 is located approximately 2.5 m below the integrated working platform 32. Hence, there is no need for additional scaffolding in the transition piece 15 for handling and routing the array cables. The integrated working platform 32 could either be suspended from the structure above by use of the support beams 22 to 27, or it could be directly mounted to a wall 42 of the transition piece 15 by the use of stays or welded brackets.

Figure 6:
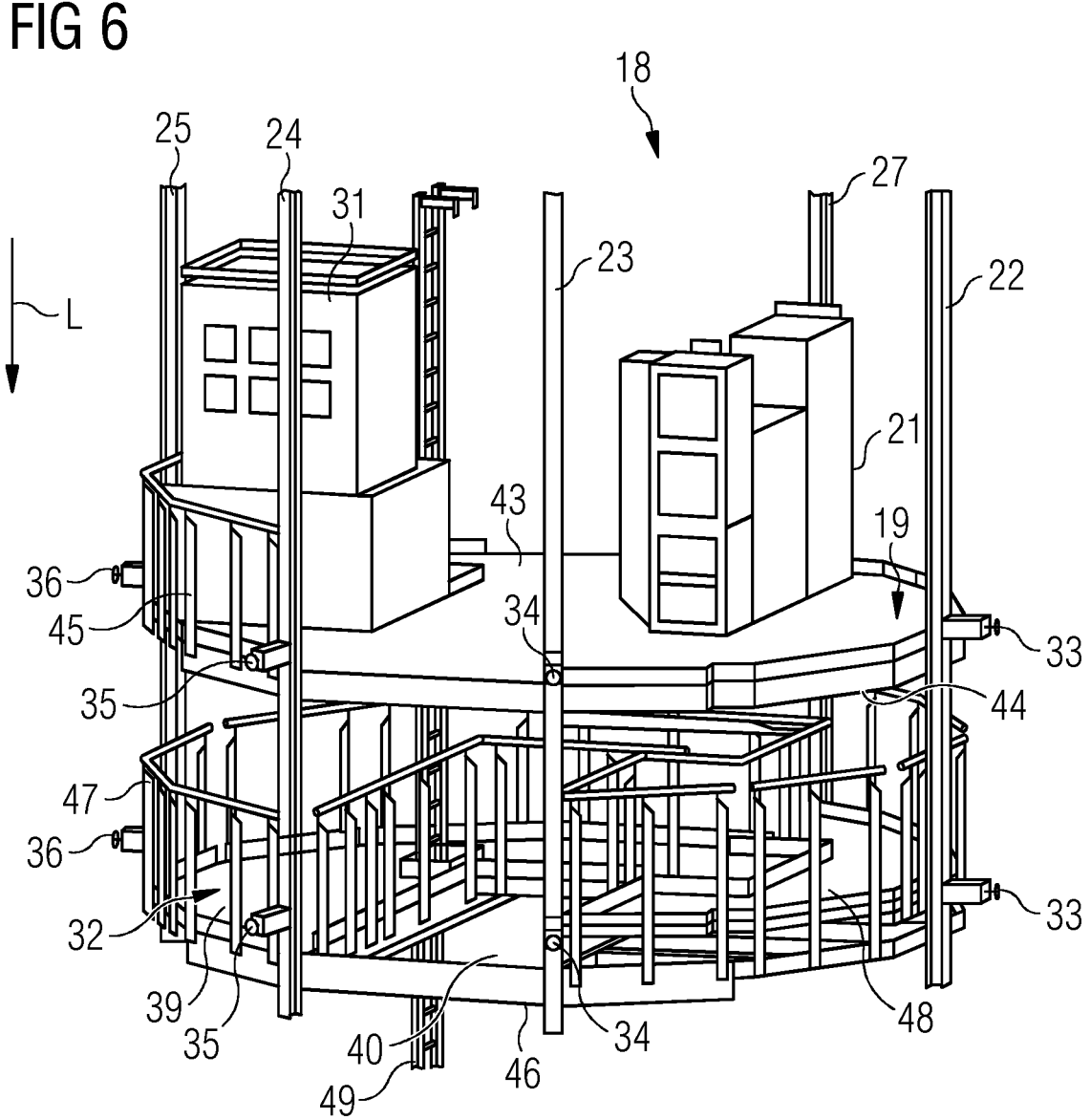
FIG. 6 shows a perspective view of a platform arrangement according to one embodiment.
Figure 7:
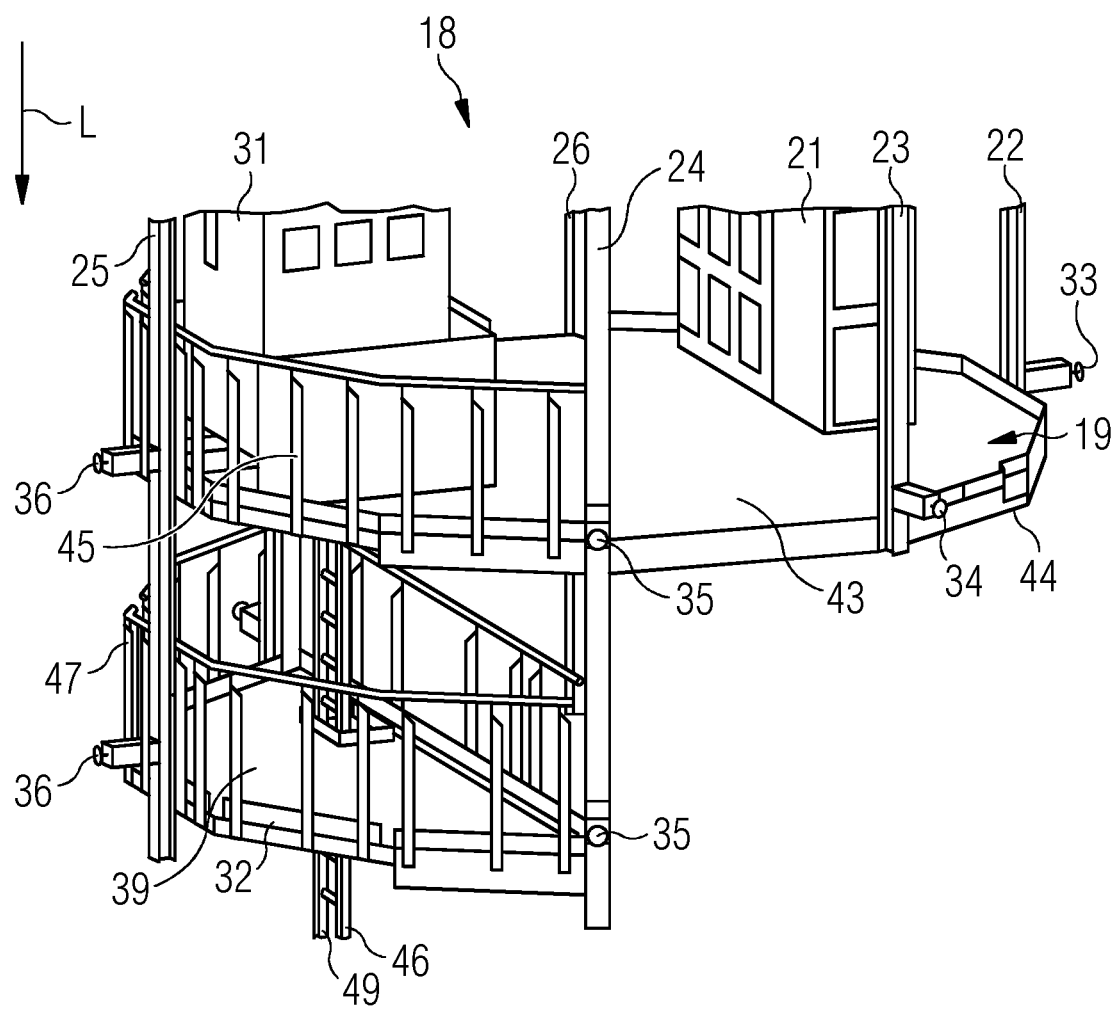
FIG. 7 shows a perspective view of a platform arrangement according to another embodiment.

As can be seen from FIG. 6, the lower platform 19 has a centrally arranged hatch 43 that can be opened for array cable pull in. The lower platform 19 further has a support structure 44 that supports the lower platform 19. The support structure 44 is attached to the support beams 22 to 27. The support structure 44 can also be directly attached to the wall 42. The support structure 44 comprises a plurality of beams that are arranged in a circular way. For security reasons, the lower platform 19 can have a handrail 45.

The working platform 32 can also be provided with a support structure 46 that supports the working platform 32. The support structure 46 is attached to the support beams 22 to 27 and/or to the wall 42. The support structure 46 comprises a plurality of beams that are arranged in a circular manner. The working platform 32 also has a handrail 47. The working platform 32 has an elevated working section 48 that is provided below the switch gear 21. The elevated working section 48 is arranged above the working platform 32. The elevated working section 48 can be elevated 100 mm to 500 mm or more, desirably 300 mm, above the working platform 32 for a better reach toward the switch gear 21.

The advantages of the permanent working platform 32 are numerous; both in terms of saved hours during service of the service lift 31 and installing the array cables. It is also advantageous in terms of a more standardized interface towards the transition piece 15, manufacturing, and thereby saving money on workshops, rescue drills, mockups and work instructions. For the service or installation of the service lift 31, there is plenty of space on the working platform 32 below the lower platform 19 where the service lift 31 lands.

Technicians can simply take a tower ladder 49 down one level to the working platform 32. Then there is access to the bottom of the service lift 31, to wire tensioners, guidewires etc. The center of the integrated working platform 32 is open and there is space for pulling array cables in, afterwards lower them down, coil them (if necessary) and then route them towards the switch gear 21 without having to erect additional scaffolding below the lower platform 19. The working platform 32 is situated around the big center opening 40.

As can be seen from FIG. 7, alternatively, the integrated working platform 32 can be made as a smaller version that is only located below the service lift 31. Hence, it is possible to do different setups of array cable routings. Advantageously, there is still access to the service space 39 for the service lift 31.

An alternative solution could be a suspended platform (not shown) rather than an integrated working platform 32, especially if it is the smaller version according to FIG. 7 only for lift service access. It could be hoist into the transition piece 15 prior to installing the rest of the structure. Then the suspended platform could be attached before the transition piece 15 is transported offshore. For both alternatives above, the working platform 32 could be mounted to the wall 42 of the transition piece 15 as well, instead of being connected to the support beams 22 to 27.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:
1. A wind turbine, comprising:
a tower,
a foundation mounted in a seabed,
a transition piece arranged between the tower and the foundation and connecting the tower to the foundation, a platform arranged inside the transition piece, wherein a switch gear is arranged on the platform, a service lift configured to be lowered to the platform, and a permanent working platform arranged below the platform and in a distance thereof, wherein the permanent working platform is arranged inside the transition piece, and wherein the permanent working platform including a service space positioned below the service lift for mounting and maintaining the service lift and to provide access below the service lift for accessing a bottom of the service lift.

2. The wind turbine according to claim 1, wherein the distance is between 2 m and 3 m.

3. The wind turbine according to claim 1, further comprising a plurality of support beams which run along a longitudinal direction of the tower, wherein the platform and the working platform are both attached to the support beams.

4. The wind turbine according to claim 3, wherein the support beams are connected to a flange of the transition piece.

5. The wind turbine according to claim 3, wherein the platform is supported by a first support structure, wherein the working platform is supported by a second support structure, and wherein the first support structure and the second support structure are both connected to the support beams.

6. The wind turbine according to claim 3, further comprising a platform arrangement which is suspended in the transition piece, wherein the platform arrangement comprises the platform, the working platform and the support beams.

7. The wind turbine according to claim 1, wherein the platform and the working platform are attached to a wall of the transition piece.

8. The wind turbine according to claim 1, wherein the working platform has an elevated working section arranged below the switch gear.

9. The wind turbine according to claim 8, wherein the working section is elevated to between 100 mm and 500 mm above the working platform.

10. The wind turbine according to claim 1, wherein the platform comprises a centrally arranged hatch.

11. The wind turbine according to claim 1, wherein the working platform comprises openings for pulling in array cables.

12. The wind turbine according to claim 1, wherein the working platform has a circular shape.

13. The wind turbine according to claim 1, wherein the working platform has a semi-circular shape.

14. The wind turbine according to claim 1, wherein a lowest tower section is connected to the transition piece.

15. The wind turbine according to claim 1, wherein the service lift can be moved from the transition piece to a topmost tower section.

16. The wind turbine according to claim 1, wherein the permanent working platform is suspended from the platform by at least one support beam.

17. The wind turbine according to claim 1, further comprising an airtight platform arranged below the permanent working platform.

\* \* \* \* \*